July 4, 1939.  H. A. LINMAN  2,164,995
LINE TIGHTENER AND FASTENER
Filed Nov. 29, 1937   2 Sheets-Sheet 1
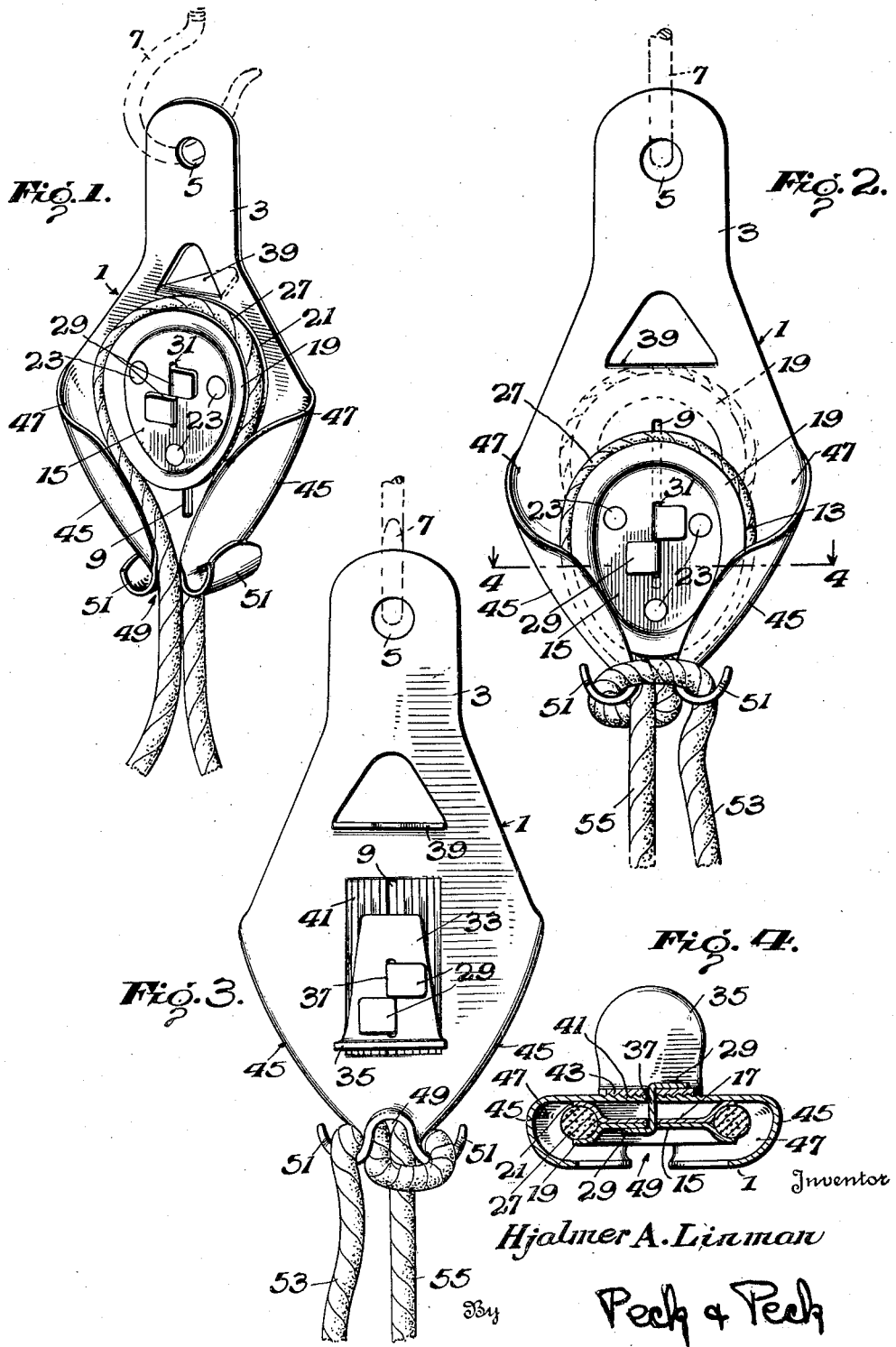

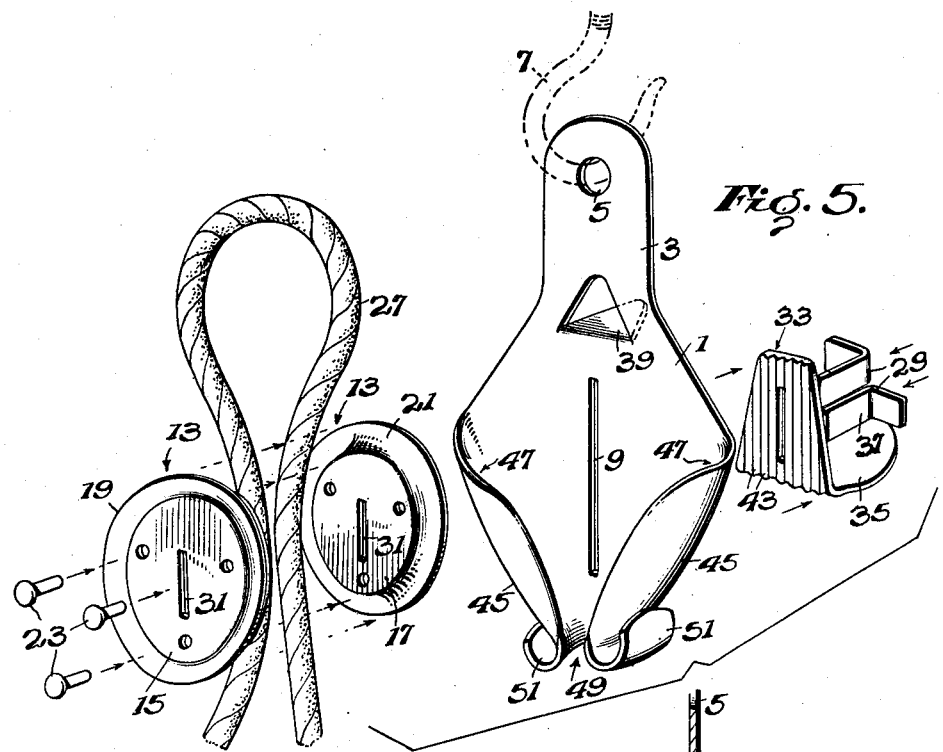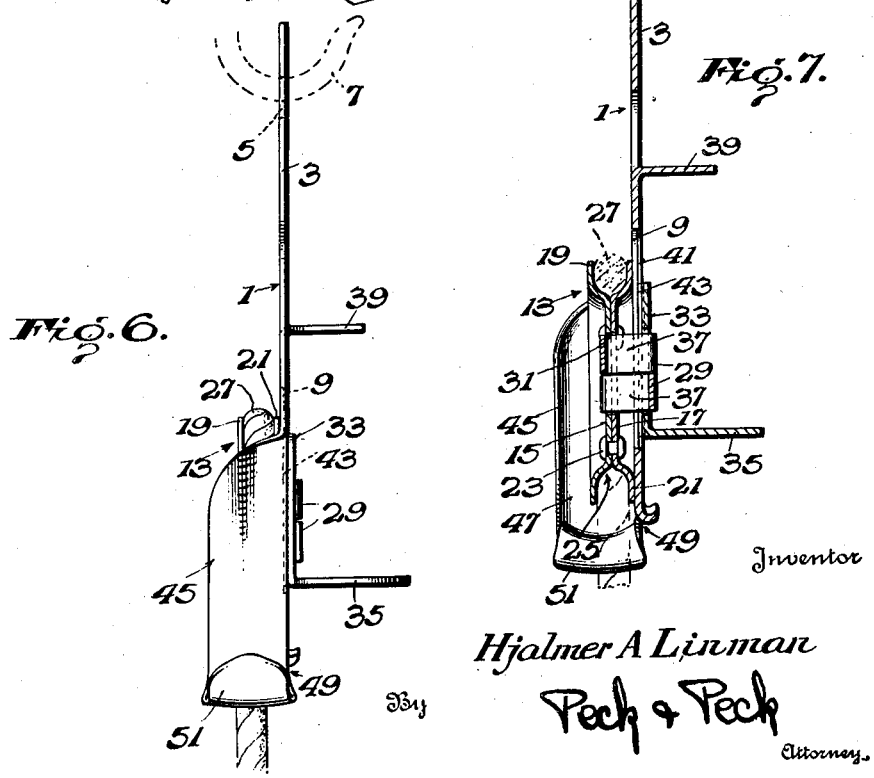

Patented July 4, 1939

2,164,995

UNITED STATES PATENT OFFICE

2,164,995

LINE TIGHTENER AND FASTENER

Hjalmer A. Linman, Minneapolis, Minn.

Application November 29, 1937, Serial No. 177,144

6 Claims. (Cl. 24—136)

This invention relates to line tighteners and fasteners for use in securing clothes lines, tent lines and the like, and is also advantageous and designed for use with nautical tackle. The device is particularly applicable for use where quick and simple line securing is desired and where it is essential that no slippage of the line occur after it has been fastened within the device.

It is an object of this invention to provide a line fastener and tightener which secures a line by means of a wedging action.

Another object of my invention is to provide a device of this type which will securely lock and hold a line when either end thereof is pulled.

A still further object of my invention is to provide a device of this type which has line locking means auxiliary to the locking means actuated by a wedging action.

A further object of my invention is to provide a device of this type, all parts of which are open and easily accessible.

An additional feature of my invention is to provide a line tightener and fastener which may be quickly and easily released from line securing position.

A further characteristic of my invention is the provision of a device of this type which is of sturdy construction yet inexpensive to produce and simple to operate.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings:

Fig. 1 is a perspective view of the device in front elevation with the line free for sliding therethrough.

Fig. 2 is a view of the device in elevation with the members in line fastening position.

Fig. 3 is a reverse view of the device to that shown in Fig. 2.

Fig. 4 is a view of a transverse section of the device taken on line 4—4 of Fig. 2.

Fig. 5 is a view of the device in perspective with the elements thereof separated but in position for assembly.

Fig. 6 is a view of the device in vertical side elevation.

Fig. 7 is a view of the device in vertical sectional elevation.

The line tighteners and fasteners which have heretofore been known and used and with which I am familiar have been faulty and not altogether successful in their operation, due primarily to continued slippage of the line after the wedge medium has been actuated to line gripping position, and in a great many instances it is essential that all slippage be eliminated if the device is to be of practical service and value. It has been my experience with devices of this type that a certain amount of slippage will occur where wedging action constitutes the sole holding means, and I have overcome these known defects by providing a line tightener which provides a wedging means for holding the line and an additional line locking means, the cooperating action of the double securing means positively insuring against line slippage.

It is also desirable and essential for practical use that a line tightener and fastener be so designed that the line in its travel through the device be easily accessible. Fasteners which are entirely or partially enclosed by a sheath or the like present serious difficulties when the line becomes unintentionally wedged or stuck, and therefore, cannot be pulled through the tightener. Such undesired wedging may be caused by knots in the rope or line and result in considerable delay and inconvenience to the user. I have done away with such disadvantages by designing a fastener which is wholly open and accessible, and is adapted to receive lines of various sizes or even to receive and accommodate lines with knots therein. In accomplishing these advantages I have not sacrificed the efficiency in tightening and securing lines for which my invention seeks, instead I have increased the advantages and produced an apparatus which is entirely practical, efficient and easy to use.

Referring to the drawings, the numeral 1, designates generally the base plate of the device which is preferably made of metal and carries and supports the various elements of the device as a unit. In the drawings I have disclosed a base plate having an elongated upper handle forming portion 3 which is provided with an aperture 5 in the upper part thereof for receiving therethrough a hook or other supporting medium 7. It is to be understood that it is within the scope of my invention to suspend, support or hold the device in any convenient and desirable manner, and I do not intend by the drawings and description to limit the size, general contour or supporting means of my invention.

As will be apparent from a consideration of the drawings, the base plate 1, is so shaped that its width is greatest at a point substantially midway between its ends, with its longitudinal edge walls converging downwardly or outwardly to provide the plate with a contracted lower or outer end around which the otherwise free end of the rope can be transversely wrapped and anchored or secured, as hereinafter explained.

I provide an elongated slot 9 cut through the lower tapering portion of the base plate 1 on the longitudinal axis of the plate. The slot provides a channel for guiding and limiting the longitudinal movement on the plate of a wedging member designated generally by the numeral 13. The wedging member comprises a pair of dished disks 15 and 17 having cooperating channel forming annular flanges 19 and 21. The disks are securely clamped together by means of rivets 23 with their concaved surfaces exposed as particularly disclosed in Figs. 4 and 5 of the drawings. By this arrangement of complementary dished disks rigidly and securely fastened together I provide a wedging member having a channel or groove 25 about its perimeter into which a line or rope 27 is disposed and adapted to travel through. While I have disclosed the wedging member as being formed of disks of substantially pear shape it is not essential that they have this contour as I intend utilizing a wedging member of a design which produces the greatest wedging action in cooperation with further wedging means to be hereinafter described.

The wedging member 13 as aforementioned is carried on the base plate 1 for vertical or longitudinal movement thereon to be moved to operative wedging position at the lower end of the slot and for upward movement to inoperative non-wedging position. As a possible means for securing the wedging member to the base plate for movement therealong I provide a pair of straps 37 which extend through the slot 9 and through slots 31 which are provided in the dished disks. The ends of each strap are bent in opposite directions and at right angles to the body of the strap to form arms or tabs 29. The arms 29 of the straps which extend through to the front of the device are bent to contact and clamp against the concave portion of the disk 15, while those which extend through to the back of the device are similarly bent to contact and clamp against a wedge member actuating means through which the strap passes and which comprises a flat plate 33 having a tab 35 extending laterally therefrom to provide a hand or finger hold for the user of the device when it is desired to move the wedge forming member 13 relative to the base plate 1. A further finger or hand hold 39 is rigidly disposed on the plate 1 a convenient distance above the tab 35 thereby affording a cooperating stationary member to the movable tab 35 and its operable organization.

From the structure so far described it is apparent that the various elements which cooperate to produce the wedge forming member are rigidly secured together to form a channel or groove to receive the bight of a rope which is being used with the device and the movements of the wedge forming member in the slot may be controlled by the elements provided at the rear of the base plate 1.

It is now clear that the user of my device may, for instance, release the wedge forming member from operative wedging position by placing one or more fingers on the tab 35 and one or more fingers on the rigid finger hold 39, so that by pressing the fingers together the tab 35 will be actuated toward the finger hold carrying with it the entire wedge forming member while the base plate remains stationary. It is to be understood that the finger holds which have been described and by which the device is operated may also be used to lower the wedge forming member into line fastening position as well as to actuate it to line releasing and freeing position. In sailboat and other nautical usage a device such as mine which is capable of releasing and fastening a rope quickly and simply by an easy hand manipulation is unusually advantageous.

In furtherance of my desire to obtain speedy and facile operation of my device I form longitudinal corrugations 41 on the rear side of plate 1 on that portion thereof against which the flat plate 33 slides and I also form complementary corrugations on the inner side of plate 33. The cooperating ribs and grooves forming the corrugations provide a trackway for facilitating movement of the assembly relative to the base plate and maintain it in proper relationship therewith, and also produce easier sliding with less effort on the operator's part and result in general additional secureness of the movements and mounting of the wedge forming member.

For cooperation with the movable wedge forming member 13 I provide the supporting body 1, with longitudinal laterally spaced rope abutment walls, such as wedge forming flanges 45 which extend along each converging edge of the lower portion of the base plate and are preferably formed integral therewith. The flanges are bent or curled to extend inwardly a limited distance over the front face of the plate 1 but spaced therefrom, thereby forming a sheath or channel 47 for receiving a line, as may be clearly seen by reference particularly to Fig. 4 of the drawings. As disclosed the flanges are formed by bending the downwardly converging edges of the plate 1 inwardly over the plate, but are so designed as to leave an open area between each flange and the plate. Flanges 45 at their lower ends are spaced one from the other to leave an opening 49 therebetween. Thus a line or rope may be looped around the wedge forming member 13 and the ends of the line from the loop may extend downwardly through the sheaths or channels 47 formed by bending the edges of the tapering portion of the base plate 1, and the line may extend out of the device through the space 49 between the lower ends of the flanges.

I have already pointed out that my line tightener utilizes means for fastening and locking a line in addition to the movable wedge forming member and the cooperating flanges whereby absolute line locking to prevent slippage is obtained. Such additional line locking means rigid with the contracted outer end of the supporting plate 1 and projecting oppositely and exteriorly therefrom and transversely with respect thereto to form a cleat or cleats, can comprise cleat forming hooks 51 which are stationary with respect to the flanges 45 and are preferably though not necessarily formed integral therewith. The hooks are disposed at the lower ends of the flanges adjacent the space 49 between their lower ends and are formed by outwardly bending or curling the lower ends of the flanges. As will be clear from a consideration of the drawings the hooks 51 provide channels for receiving a line as it falls free of the device through the opening or egress 49 therefrom. One hook of the pair of hooks 51 being disposed adjacent the free end 53 of the line and the other hook of the pair being disposed adjacent the taut end 55 of the line. The channel which is formed by the bent hooks may, of course, be designed to accommodate ropes of varying sizes.

The line or rope 27 when in position in the device is disposed in the channel 25 formed by the flanges of the dished disks 15 and 17 and each end of the rope extending from the loop about the wedge forming member is threaded downwardly in the sheath or channel 47 formed by the flanges 45 to pass out of the device through the opening 49 between the cleat forming hooks 51. With the line free of hooks it will readily be seen that it may be fastened within the device by either pulling on the free or lazy end of the line or by the action of the operator pressing on the tab 35, either operation will actuate the wedge to its low position in the slot 9, thus securing the line between the wedging member 13 and the inner surface formed by the flanges 45. The pear shape of the wedge forming member and the tapering design of the base plate 1 with the flanges along the edge thereof coact to produce a strong wedging and fastening action on the line which is disposed in the channel 47. However, I have found that the above fastening by wedging alone as disclosed in Fig. 1 of the drawings is not sufficient to positively insure against line slippage and I utilize the hooks 51 for overcoming the disadvantages of fastening a line solely by means of a wedging action.

To insure against slippage of the line the free end 53 thereof is carried laterally behind the taut end 55 of the line 27 and into the channel of the hook 51 which is adjacent the taut line, and then the line which is being secured to the hooks is carried across in front of the taut end of the line and passed through the channel formed by the hook on the opposite side of the device and thus wrapped transversely and exteriorly around the outer ends of walls 45, and thus around the contracted outer end of supporting body 1. By particular reference to Fig. 2 of the drawings the details of the manner of securing a line about the hooks is clearly disclosed and it is there seen that the free end 53 of the line which is roved about the wedging member 13 is looped so as to form an eye around the taut end 55 of the line. Thus when the wedging member 13 is in lower line wedging position relative to the base plate and the free end of the line is carried in the hooks as described it is apparent that even though there may be limited slippage of the line in its channels 47 there will be no give to the line which is additionally secured against slipping by being looped about the hooks. It will be noted that the upper rope receiving end of the slidable wedge 15 is formed to fit in the transverse portion of the bight of the looped rope and thus impart to the wedge the outward longitudinal pull of the bight of the rope to maintain the constant locking wedge action of the member 15 on the rope.

The invention as described presents a wedge forming apparatus which is compact and sturdy. By forming the flanges 45 and the hooks 51 as an integral part of the base plate 1 it is evident that production costs can be reduced. Furthermore, the device presents a line tightener and fastener which leaves the rope visible and accessible when it is in position therein so that rope defects which would cause sticking and undesired wedging are easily and quickly remedied.

It is my intention to provide a line tightener which is capable of handling lines of several sizes and with this end in view I have designed a device to present channels on the wedge forming member 13 and those formed by the flanges 45 and the capacity of the hooks 51 sufficiently large to accommodate ropes of various sizes. The construction of the elements as outlined will also allow knotted ropes to travel in the device without causing sticking and undesired wedging. By employing two hooks disposed in a convenient position for receiving the line I am enabled to insure line locking and to manipulate the line about the hooks in a rapid and efficient manner. The particular position of the hooks 51 is practicable as it allows the user of the device to secure the rope to the hooks when the rope is being held by the wedge forming member 13. In other words, the user while securing the rope about the hooks is not obliged to hold the rope against slippage. I also desire to point out at this time that no roughened surfaces are required in order to obtain proper locking of the rope, this is, of course, desirable as it does not cause such rapid wear upon the rope.

What I claim is:

1. A rope or line fastener, comprising: a supporting body for a bight of the rope to be fastened; said body having a contracted outer end; locking means for clamping both lengths of said bight to the body under the outward pull of said rope bight thereon, with the two lengths of said bight extending side by side longitudinally of said body outwardly from said means and said contracted body end, one length forming the rope end to be anchored to said body, and the other length forming the load carrying line or rope length; a pair of exterior transverse oppositely-disposed cleat-forming projections rigid with said contracted end of said body, and spaced apart for the outward longitudinal passage therebetween of said two lengths of said bight, whereby said rope end thereof can be directed laterally and wrapped transversely substantially around said contracted body end and thus held and anchored directly to said body by said projections.

2. A rope fastener, comprising a body for supporting a bight of the rope, said body adapted to be attached to a support, said body provided with a pair of edge walls rigid therewith and converging toward the outer end of the body and at their outer ends forming a pair of oppositely, laterally, and upwardly projecting hook-like cleats rigid with said walls and adapted to hold and anchor the rope end of said bight transversely wrapped substantially around the outer end of the body; a wedge member arranged on said body between and in rope clamping and releasing cooperative association with said walls, and confined to said body for relative movements toward and from said cleats, said member formed to fit in the closed end of said bight and to directly receive and sustain the outward pull of the transverse portion of the rope bight thereon.

3. A rope fastener comprising a longitudinally elongated body plate having a pair of outwardly projecting flanges rigid therewith and arranged longitudinally thereof and converging toward the outer end of the body plate, the outer ends of said flanges forming outwardly and oppositely extending and upwardly directed hook-like transverse cleats rigid with and depending from the lower ends of the flanges; and a wedge member carried by said plate and relatively movable to clamp and release the rope, and located between said flanges and above said cleats for receiving a bight of the rope, and clamping both lengths of the bight against said flanges, said wedge member transversely formed at its inner end to directly receive and fit in the closed end of said bight.

4. A rope fastener adapted to directly receive a bight of the rope to be fastened, comprising a body plate having laterally spaced rope-abutment walls rigid therewith and at their outer ends provided with means rigid therewith and transversely projecting therefrom for holding a rope end of the bight transversely wound substantially around the lower ends of said walls and directly anchored thereby; a wedge member formed to directly fit in the closed end of the rope bight and to sustain the outward longitudinal pull of the transverse portion of said rope bight thereon, said member arranged on said plate between said walls in cooperative relation thereto to clamp and release both lengths of the bight, said member confined to said plate for relative movements.

5. A rope fastener comprising a supporting plate having abutments rigid therewith for engaging both lengths of a rope bight in said plate; a relatively-movable member between said abutments and in cooperative rope clamping and releasing association therewith, said member transversely formed to snugly and directly receive and fit in the closed end of a rope bight located between said abutments with its two lengths depending therefrom, the lower end of said plate provided with exterior opposite lateral projections rigid therewith and spaced apart for the free outward passage of said two rope lengths for anchoring to said plate the outwardly deflected rope end of said bight wrapped transversely around the lower end of said plate.

6. A rope fastener including a supporting plate having longitudinal opposite rope abutment walls rigid therewith, said plate at its outer end providing means rigid therewith for anchoring directly thereto the otherwise free rope end of a bight secured to the plate; a wedge member arranged on the outer face of the plate between said walls and confined to the plate for movement toward and from said walls, said member being transversely formed to directly fit in the closed end of a bight of the rope to be fastened and to directly sustain the outward longitudinal pull of the rope bight, said wedge member having a member fixed thereto and exposed and accessible at the rear side of the plate for moving said wedge member toward and from rope clamping position, said plate having a rearwardly projecting member rigid therewith and spaced from and arranged in cooperative relation to said member-operating member.

HJALMER A. LINMAN.